United States Patent [19]

Wise et al.

[11] Patent Number: 5,059,380
[45] Date of Patent: Oct. 22, 1991

[54] TIRE MOLD VENT PLUG AND METHOD

[75] Inventors: Thomas E. Wise, Seville; John P. Czarnecki, Uniontown; William F. Mattson, Hinckley, all of Ohio

[73] Assignee: The Uniroyal Goodrich Tire Company, Akron, Ohio

[21] Appl. No.: 483,178

[22] Filed: Feb. 22, 1990

[51] Int. Cl.⁵ .................. B29C 33/10; B29C 35/02
[52] U.S. Cl. .................. 264/326; 249/141; 425/28.1; 425/812; 264/315
[58] Field of Search .......... 425/28.1, 29, 34.1, 425/43, 812, 32; 264/315, 326; 249/141

[56] References Cited

U.S. PATENT DOCUMENTS

| | | | |
|---|---|---|---|
| 2,587,297 | 2/1952 | Duerksen | 425/28.1 |
| 3,553,790 | 1/1971 | Brobeck et al. | 425/812 |
| 3,608,602 | 9/1971 | Youngblood | 425/28.1 |
| 4,436,497 | 3/1984 | Dahl et al. | 425/28.1 |
| 4,740,145 | 4/1988 | Shurman | 425/28.1 |
| 4,759,701 | 7/1988 | Carter | 425/812 |

FOREIGN PATENT DOCUMENTS

| | | | |
|---|---|---|---|
| 45-5896 | 2/1970 | Japan | 425/812 |
| 60-52313 | 3/1985 | Japan | 425/812 |
| 60-52314 | 3/1985 | Japan | 425/812 |
| 61-252110 | 11/1986 | Japan | 425/812 |
| 61-252112 | 11/1986 | Japan | 425/812 |

Primary Examiner—Jan H. Silbaugh
Assistant Examiner—Mathieu Vargot
Attorney, Agent, or Firm—Greg Strugalski; Alan A. Csontos

[57] ABSTRACT

A mold for curing a green tire which is made of an elastomeric material capable of flowing prior to curing. The mold includes a surface defining a cavity in the mold for receiving the green tire. A passage communicates the cavity with the exterior of the mold. A vent plug is located in the passage. The vent plug has an opening extending therethrough communicating the cavity with the passage. Elastomeric material may flow into the opening to form a projection extending from the tire as the green tire is pressed against the surface defining the cavity during a molding operation. The vent plug has a portion extending into the cavity a predetermined distance from the surface to form a recess in the tire adjacent the projection. The recess provides a space that the projection may deflect into to prevent shearing off of the projection during removal of the tire from the mold.

11 Claims, 5 Drawing Sheets

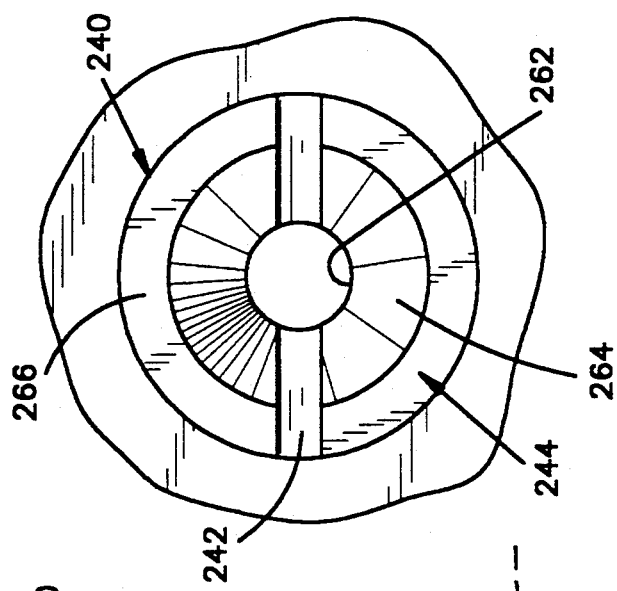
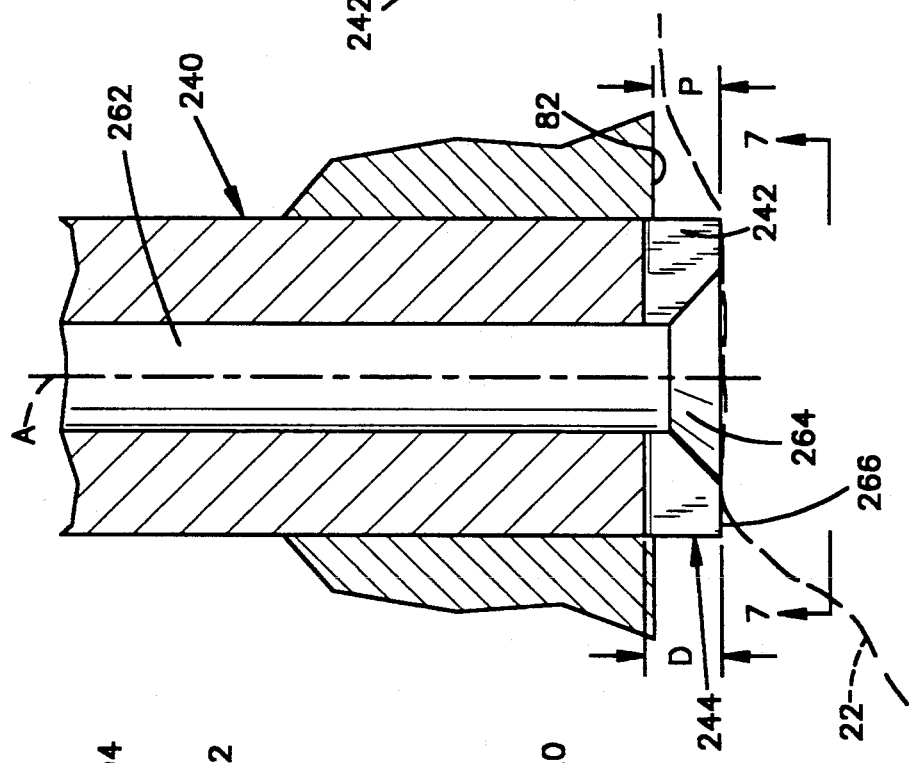
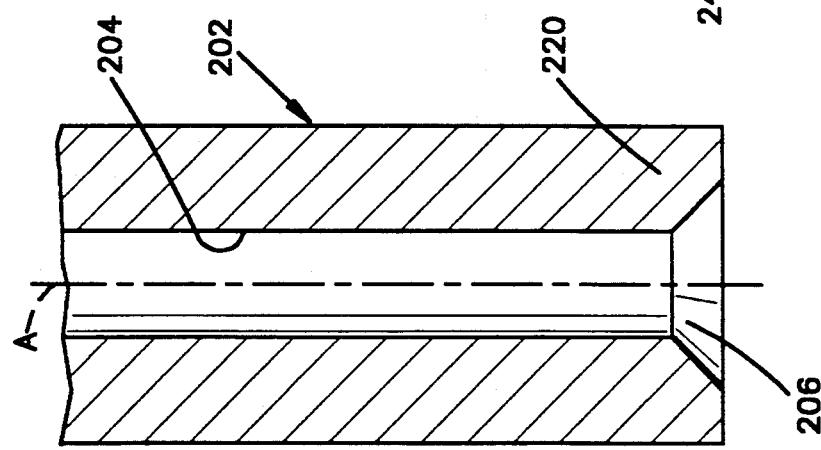

TIRE MOLD VENT PLUG AND METHOD

BACKGROUND OF THE INVENTION

1 Field of the Invention

The present invention relates to a mold for curing an elastomeric article, such as a tire, and which mold has a vent passage communicating a cavity in the mold with the exterior of the mold. In particular, the present invention relates to a vent plug located in the vent passage for providing air bleed and restricting the amount of elastomeric material that may enter the vent passage.

2 Description of the Prior Art

It is known that during a tire molding operation, a plurality of relatively small projections are formed on ground engaging tread elements located about the outer circumference of a tire. These projections form by uncured elastomeric material flowing into vent passages in a mold. The projections then cure in the passages. The projections are generally considered visually unappealing and undesirable enough to require trimming away.

The projections have a further disadvantage because they can separate from the tire during stripping of the cured tire from the mold. A separated projection may remain in its respective passage, which renders the vent passage ineffective. A separated projection may also fall into the bottom of the mold. If the projection is not removed from the bottom of the mold, the projection can cause a visual defect in a tire that is formed subsequently in the mold.

The disadvantages associated with projections have been addressed mainly by inserting a vent plug into the vent passage. One such vent plug is disclosed in U.S. Pat. No. 4,436,497 and includes an opening extending longitudinally therethrough. The vent plug disclosed in U.S. Pat. No. 4,436,497 is inserted into a vent passage to reduce the effective cross-sectional area of the vent passage into which elastomeric material of an uncured tire may flow. The reduced cross-sectional area of the vent passage proportionately reduces the resistance to removal of the projection during stripping of the cured tire from the mold but also reduces the strength of projection. The end of the opening in the vent plug located adjacent the mold cavity is chamfered to thicken the base of the projection on the tire. The base of the projection is strengthened to reduce the propensity of the projection from breaking at the base. The chamfer increases resistance to tensile breakage but decreases resistance to shear failure. The thickened base, thus, may present a problem of the projection shearing off during stripping of the tire from the mold. Specifically, when the tread element is pulled or scraped across a rib on the mold, stresses may develop in the base of the projection which exceed the strength of the elastomeric material.

Other prior art systems for molding tires have centered on completely eliminating projections from a tire. For example, U.S. Pat. No. 4,740,145 discloses a vent plug made from a compressible material. The vent plug is porous and is located in a vent passage to project a predetermined distance into the mold cavity. When the uncured tire is pressed against the surface defining the cavity, the vent plug is compressed to substantially the same contour as the adjacent surface defining the cavity. The porosity of the vent plug permits venting of air through the vent passage but may be prone to clogging by the elastomeric material.

SUMMARY OF THE INVENTION

The present invention is directed to a tire mold and to a method of molding a tire. An uncured or "green" tire is made of an elastomeric material that is capable of flowing prior to curing. The mold includes a surface defining a cavity for receiving and shaping the green tire. A passage communicates the cavity with the exterior of the mold. A vent plug is located in the passage. The vent plug has an opening extending therethrough for communicating the cavity with the passage. Elastomeric material may flow into the opening as the green tire is pressed against the surface defining the cavity during a molding operation to form a projection extending from the tire. The vent plug has a portion extending into the cavity a predetermined distance from the surface defining the cavity to form a recess in the tire adjacent the projection. The recess provides a space that the base of the projection may deflect into to prevent shearing off of the projection during removal of the tire from the mold.

The vent plug is made from an incompressible material, such as metal. The vent plug extends a distance into the cavity up to approximately 0.05 inch. A rib projects into the cavity for forming a groove in the tire to at least partially define a tread element on the tire. The opening in the vent plug is located entirely within 0.25 inch of the rib. The mold has a surface defining a parting line. The mold is separable into two parts about the parting line. The rib is located adjacent the parting line and between the parting line and the vent plug.

The vent plug includes a chamfer located at an end of the opening in the portion of the vent plug extending into the cavity. The chamfer is defined by a frustoconical surface extending from the opening to the end of the vent plug at an angle greater than about 40° relative to the longitudinal central axis of the opening. The vent plug further includes a groove located in an end of the portion extending into the cavity. The groove communicates the opening in the vent plug with the cavity after the green tire contacts the end surface of the vent plug.

BRIEF DESCRIPTION OF THE DRAWINGS

Further features of the present invention will become apparent to those skilled in the art to which the present invention relates from reading the following specification with reference to the accompanying drawings, in which:

FIG. 5 is a longitudinal cross-sectional view of a portion of the vent plug according to one embodiment of the present invention;

FIG. 6 is a longitudinal cross-sectional view of a portion of the vent plug according to another embodiment of the present invention and illustrating a groove in an end of the vent plug; and FIG. 7 is an end view of the vent plug in FIG. 6, taken along line 7—7 in FIG. 6.

DESCRIPTION OF PREFERRED EMBODIMENTS

Figure 1:
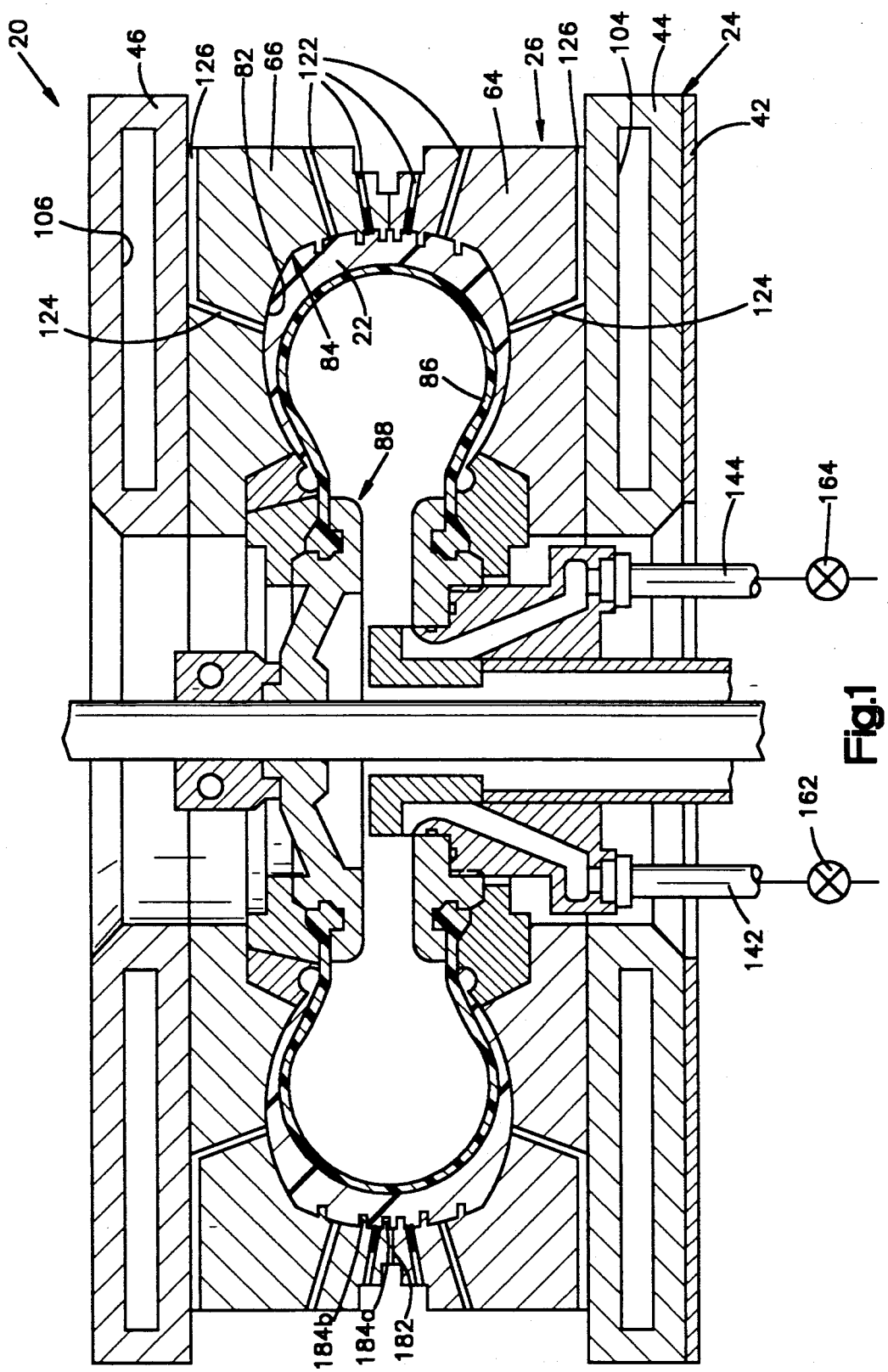
FIG. 1 is a cross-sectional view of a tire mold embodying the present invention.

A tire molding system 20 for curing an uncured or "green" tire 22 is illustrated in FIG. 1. The tire molding system 20 includes a press 24 and a mold 26. The press 24 includes a bed 42, a lower platen 44 fixed to the bed and a movable upper platen 46. The mold 26 includes a lower mold half 64 and an upper mold half 66 which are attached to the upper and lower platens 44, 46, respectively. The press 24 also includes a drive mechanism (not shown) for raising, lowering and tilting the upper platen 46 and upper mold half 66. While a two-piece "clamshell" type mold is illustrated, it will be apparent that the concept embodied in the present invention is equally applicable to other types of molds, such as those molds utilizing radially movable segments.

The mold 26 includes a surface 82 defining a cavity 84 for shaping and curing the green tire 22. The green tire 22 is received in the cavity 84 of the mold 26 at the start of a molding cycle. An inflatable bladder 86 is attached to a diaphragm assembly 88 at the center of the press 24. The bladder 86 inflates in response to fluid pressurization and forces the green tire 22 against the surface 82 defining the cavity 84, once the mold halves 64,66 are in the closed position, as illustrated in FIG. 1.

The press 24 is heated by steam supplied to annular chambers 104 and 106 in the platens 44 and 46, respectively. Heat is conducted from the platens 44,46 of the press 24 to the mold 26. The heating is preferably continuous to maintain a substantially constant temperature of the mold 26. The heat and pressure from steam in the bladder 86 and heat in the mold 26 cooperate to cure the elastomeric material comprising the green tire 22 over a predetermined cure time.

A plurality of vent passages 122 extend from the cavity 84 to the exterior of the mold 26. Another plurality of vent passages 124 extend from the cavity 84 to respective channels 126 in the mold halves 64,66. The channels 126 communicate with the exterior of the mold 26. It will be apparent that the passages 122,124 and channels 126 may optionally communicate with a vacuum source.

The tire molding system 20 also includes an inlet conduit 142 and an outlet conduit 144 in communication with the bladder 86. A valve 162 controls the flow of water and steam to the inlet conduit 142. A valve 164 controls the flow of water and steam from the outlet conduit 144 to tank.

Figure 2:
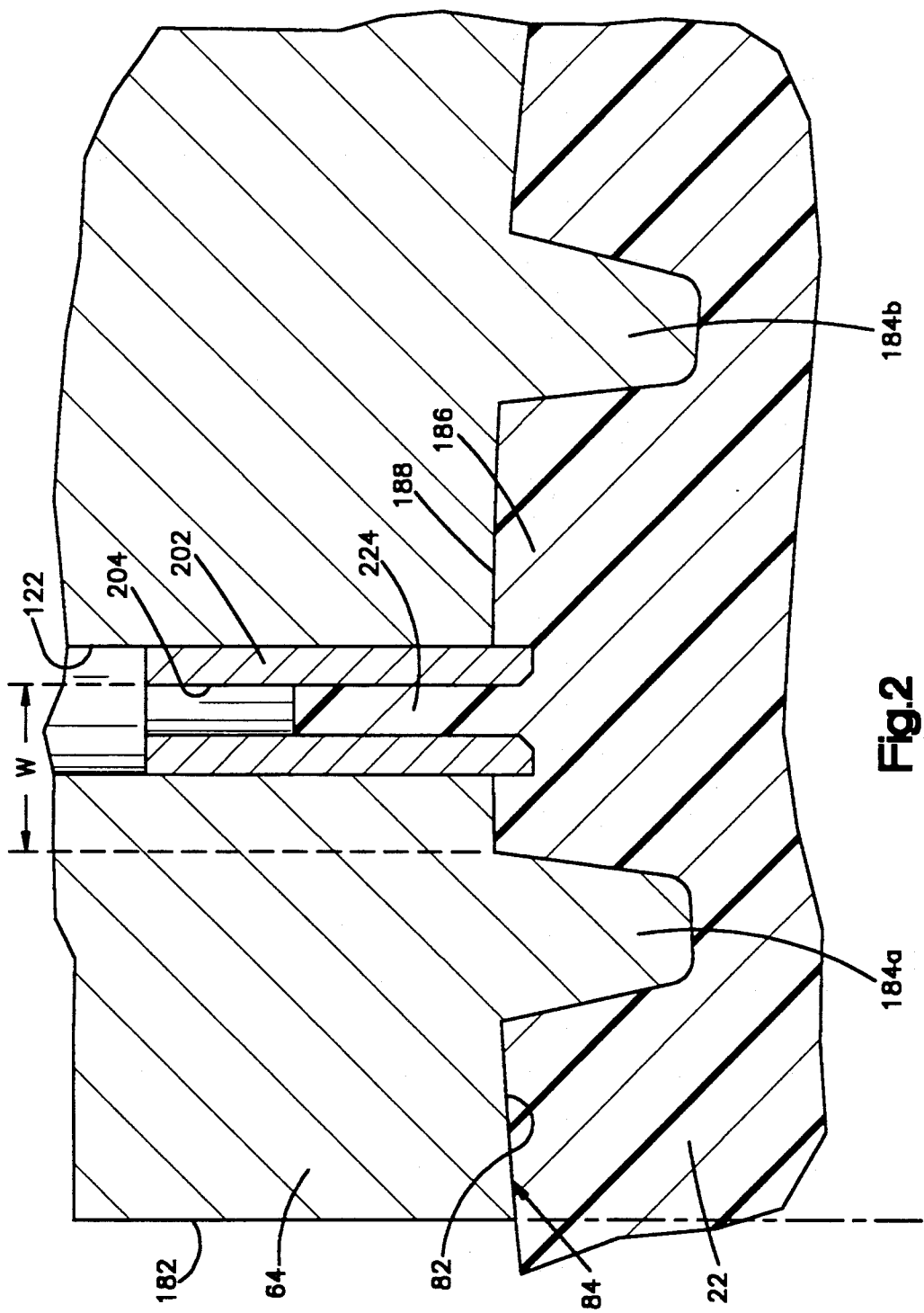
FIG. 2 is an enlarged view of a portion of the mold in FIG. 1 and illustrating a vent plug located in a vent passage in the mold.

In FIG. 2, the upper mold half 66 (not shown) is separated from the lower mold half 64. The portion of the lower mold half 64 illustrated in FIG. 2 is enlarged for clarity. The upper mold half 66 separating from the lower mold half 64 occurs after the tire 22 is cured and the press 24 opened. It is after the mold halves 64,66 are separated, that the cured tire 22 can be removed or "stripped" from the lower mold half 64. While the tire 22 is illustrated in FIG. 2 as remaining in the lower mold half 64 after curing, it will be apparent to one skilled in the art that the tire may remain in the upper mold half 66.

The lower mold half 64 includes a surface 182 defining a parting line of the mold 26 and is generally located near the mid-circumferential plane of the tire 22. The parting line surface 182 defines a plane about which the mold halves 64,66 are separable into two parts. Ribs 184a, 184b extend from the portion of the lower mold half 64 into the cavity 84. The ribs 184a, 184b form grooves in the tire 22. The grooves in the tire 22 formed by the ribs 184a, 184b, at least partially define a tread element 186 on the outer circumference of the tire. The tread block elements 186 provides a ground engaging surface 188 of the tire 22.

The passage 122 vents the space located between adjacent ribs 184a, 184b defining the tread element 186 to the exterior of the mold 26. The passage 122 preferably has a circular cross-section with a diameter of approximately 0.125 inch. formed by drilling. The venting is required during a molding operation as the green tire 22 is forced against the surface 82 defining the cavity 84 by fluid pressure increasing within the bladder 86. The venting prevents fluid from being trapped between the ribs 184a, 184b by the green tire 22 and permits the elastomeric material forming the tread element 186 to contact the surface 82 and properly cure. If venting of the space between the ribs 184a, 184b was not permitted, visible blemishes and material voids may be created in the tread element 186.

A vent plug 202 (best seen in FIG. 4) is located in the passage 122 for restricting the amount of uncured elastomeric material that can flow into the passage. Thus, the chances that a relatively large vent projection may appear on the tire 22 is reduced. The vent plug 202 is made from tubular steel and has a cylindrical outer surface. The outer diameter of the vent plug 202 is preferably slightly larger than the inner diameter of the passage 122 to provide an interference fit of approximately 0.001–0.003 inch when the mold 26 is at operating temperatures.

A longitudinally extending opening 204 is centrally located in the vent plug 202. The opening 204 enables fluid communication between the cavity 84 and the passage 122. The opening 204 preferably has a circular cross-section with a diameter of 0.052 inch. The end of the opening 204 adjacent the cavity 84 has a chamfered portion 206. The chamfered portion 206 extends at an angle of preferably at least 40° (FIG. 5) relative to the longitudinal central axis A of the opening 204.

The passage 122 and vent plug 202 are located on a side of the rib 184a opposite the parting line surface 182 in the lower mold half 64. The vent plug 202 is located in the mold so the opening (not including the chamfer 206) is located completely within a distance W (FIG. 2) from the rib 184a. The distance W is preferably less than 0.200 inch. Locating the vent plug 202 relatively close to the rib 184a assures that the elastomeric material does not block the opening 204 until a substantial amount of fluid has vented as the green tire 22 is forced against a portion of the surface 82 defining the cavity 84 located between the adjacent ribs 184a, 184b. Blocking of the opening 204 occurs because the elastomeric material of the green tire 22 is generally U-shaped as it is forced between the ribs 184a, 184b. The U-shaped elastomeric material, thus, contacts the bottom of the surface of the cavity at a location substantially equidistant between the adjacent ribs 184a, 184b. Thus, by placing the vent plug 202 relatively close to a rib 184a, an adequate amount of fluid may vent from between the mold surface 82 and the green tire 22 so curing is not adversely affected.

The elastomeric material comprising the green tire 22 is capable of flowing prior to curing. Thus, when the green tire 22 is forced against the surface 82 defining the cavity 84 located between the ribs 184a, 184b, a portion of the elastomeric material may flow into the opening 204 of the vent plug 202. This elastomeric material then cures in the opening 204 to form a vent projection 224 because the mold and the vent plug are maintained at an elevated temperature during the curing operation.

According to the present invention, the end 220 (best seen in FIG. 4) of the vent plug 202 extends outwardly of the surface 82 defining the cavity 84 for a predetermined distance P. The predetermined distance P is preferably in the range of 0.030 inch to 0.050 inch. The end 220 of the vent plug 202 projecting into the cavity 84, thus, forms an annular void or recess 222 (FIGS. 3 and 4) in the tire 22 adjacent to and surrounding the vent projection 224.

Figure 3:
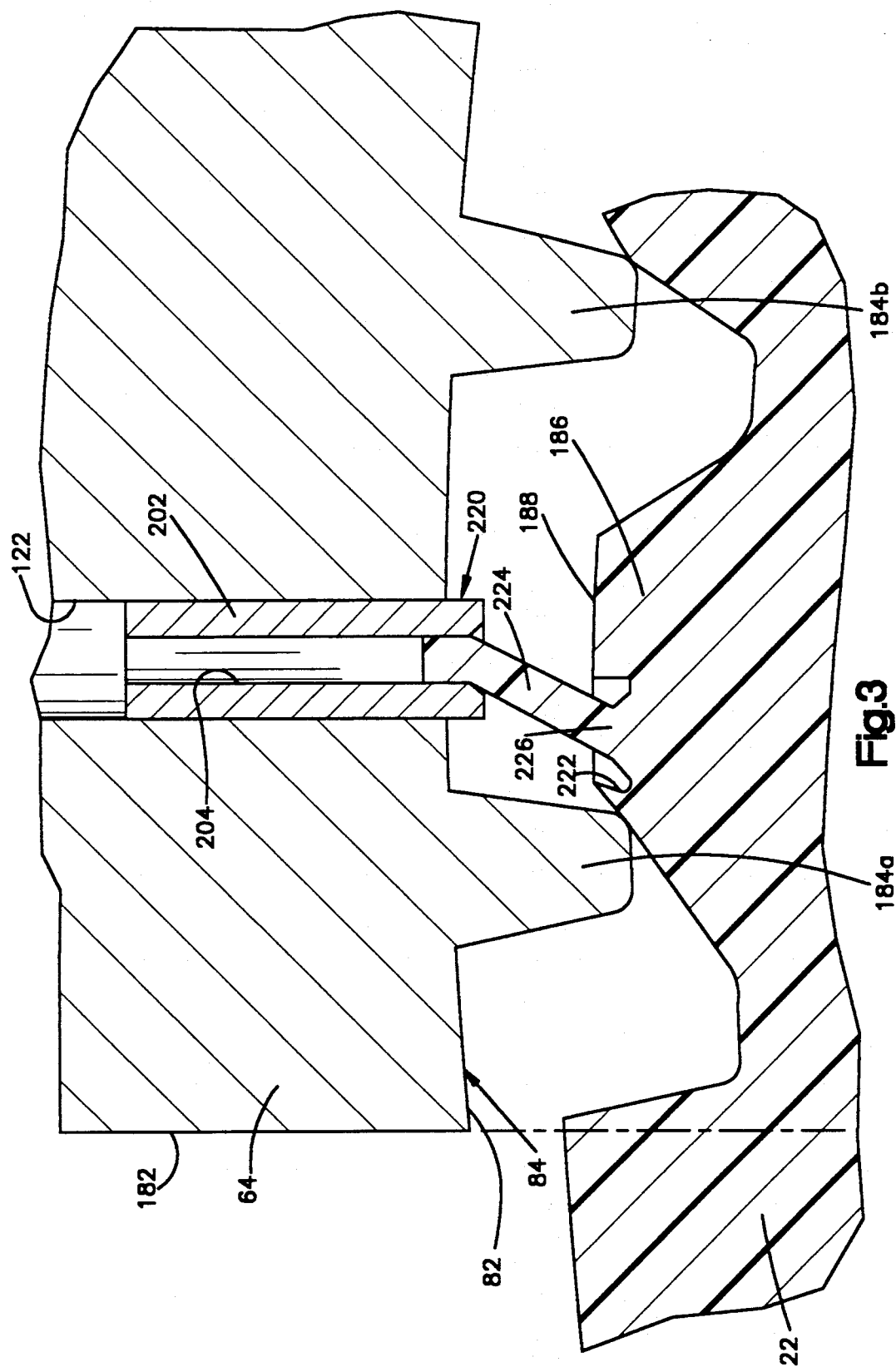
FIGS. 3 and 4 are views similar to FIG. 2 illustrating a cured tire being stripped from the mold.
Figure 4:
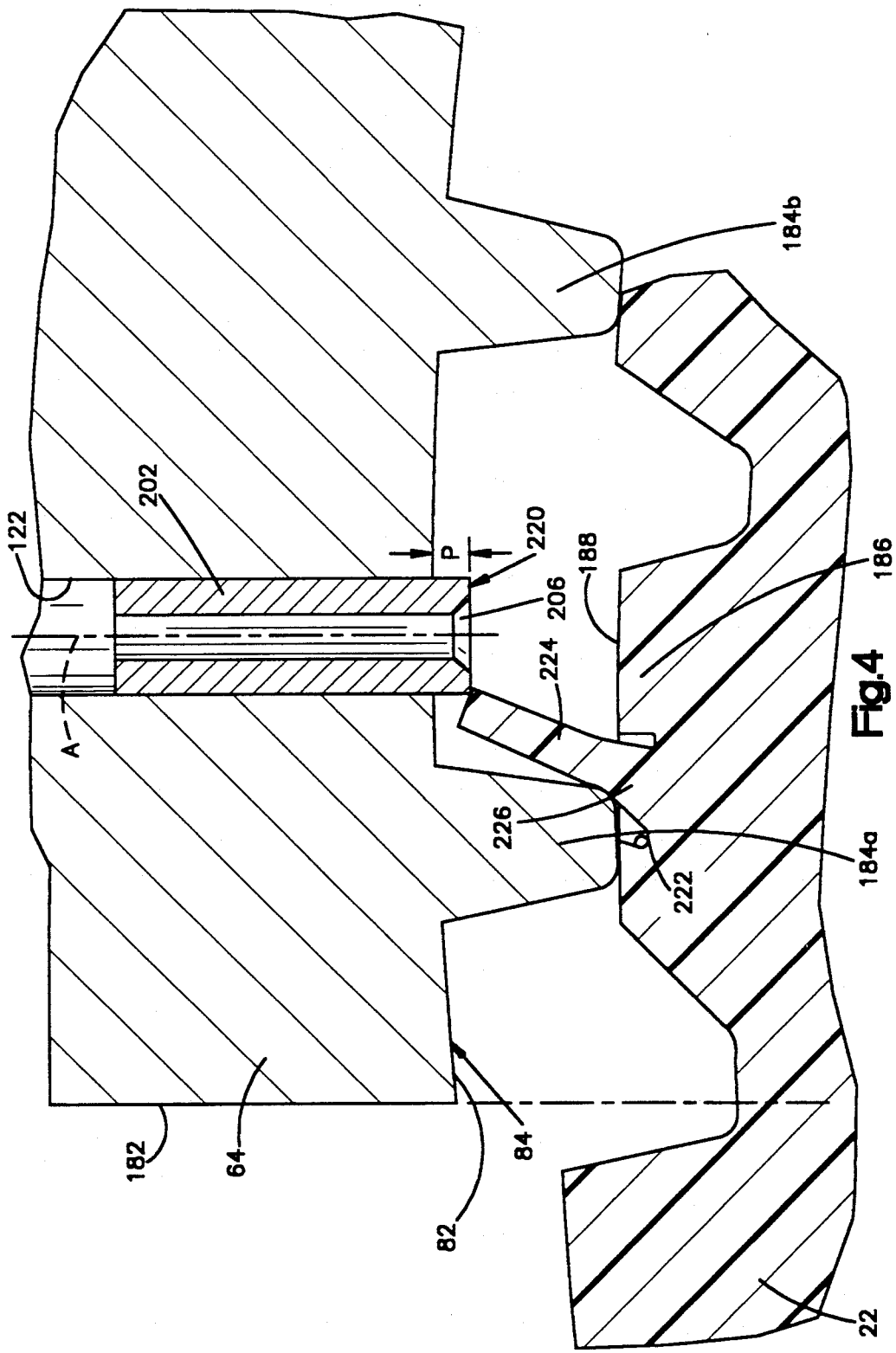

The recess 222 provides a space devoid of material for the vent projection 224 to deflect into when the tire 22 is stripped from the mold 26, as illustrated in FIGS. 3 and 4. This reduces the shearing effect at the base 226 of the vent projection formed in the chamfer 206 when the tread element 186 is scraped across the rib 184a. This reduced shearing effect results by exposing the relatively smaller diameter portion of the vent projection 224 to the rib 184a instead of the relatively rigid and stronger base 226. Thus, the vent projection 224 is less prone to shear off from the tire 22 at its base 226 and remain in the vent plug 202 or fall into the bottom of the mold 26 to cause a blemish defect in a subsequent tire formed in that mold.

During the cure cycle, the tire 22 is maintained in contact against the surface 82 defining the cavity 84, as illustrated in FIG. 2. After the cure cycle is completed, the mold halves 64,66 are opened and the cured tire is stripped from the mold by forcing the tire to move axially of one of the mold halves purely by mechanical force. The tire 22 becomes deformed radially and axially, as illustrated in FIG. 3. The projection 224 moves axially from the opening 204 and begins to bend.

Upon the application of further stripping force, the tire 22 deforms approximately to the shape illustrated in FIG. 4. The base 226 of the vent projection 224 deflects in the recess 222. The base 226 of the vent projection, thus, is not subject to the relatively high mechanical shear stress and strain caused by the tread element 186 scraping across the rib 184a.

An alternate embodiment of the present invention is illustrated in FIGS. 6 and 7. A vent plug 240 embodying the present invention is identical in every way to the vent plug 202 described above and illustrated in FIG. 5 but has further features as described below.

The vent plug 240 (FIG. 6) has a transverse groove 242 machined into the end portion 244 which extends into the cavity 82 of the mold 26 a predetermined distance P. The transverse groove 242 enables fluid communication between the cavity 84 and opening 262 after the green tire 22 (shown in phantom) engages an end surface 266 of the vent plug 240. Thus, any fluid that may be trapped between the green tire 22 and surface 82 defining the cavity 84 may vent even after the end 266 of the vent plug 240 has been contacted and sealed off from the cavity 84.

The groove 242 is illustrated as having a depth D which is slightly larger than the predetermined distance P that the end portion 244 of the vent plug 24 extends into the cavity 84 of the mold 26. This will assure that fluid communication is enabled between the cavity 84 and the opening 262 continuously until the moment that the elastomeric material comprising the green tire 22 completely encircles the end portion 244 of the vent plug 240 extending into the cavity 84.

From the above description of the preferred embodiment of the invention, those skilled in the art will perceive improvements, changes and modifications. Such improvements, changes and modifications within the skill of the art are intended to be covered by the appended claims.

Having described a preferred embodiment of the present invention, what is claimed is:

1. A mold for curing a green tire which is made of an elastomeric material capable of flowing prior to curing, said mold comprising:
   surface means defining a cavity in the mold for receiving and shaping the green tire;
   passage means for communicating the cavity with the exterior of the mold; and
   a tubular metal vent plug located in said passage means, said vent plug having an opening extending longitudinally therethrough communicating the cavity with said passage means and into which opening uncured elastomeric material may flow as the green tire is pressed against said surface means during a molding operation to form a projection extending from the tire, said vent plug having a portion extending into the cavity a predetermined distance from said surface means to form a circular recess in the tire surrounding the projection.

2. The mold set forth in claim 1 wherein said predetermined distance is in the range of 0.03 inch to 0.05 inch.

3. The mold set forth in claim 1 further including a mold rib projecting into the cavity for forming a groove in the tire and which groove defines a tread element in the tire, the opening in said vent plug being located entirely within 0.2 inch of said mold rib.

4. The mold set forth in claim 1 further including surface means defining a parting line about which said mold is separable into two parts, said mold rib being located adjacent the parting line and between the parting line and said vent plug.

5. The mold set forth in claim 1 wherein said vent plug includes a chamfer located at an end of the opening in said portion of said vent plug extending into said cavity.

6. The mold set forth in claim 5 wherein said chamfer is defined by a frustoconical surface extending from said opening to the end of said vent plug at an angle greater than about 40° relative to the longitudinal central axis of the opening.

7. The mold set forth in claim 1 wherein said vent plug further includes means for communicating said opening with the cavity, said communicating means being located in said portion of said vent plug extending into the cavity, said communicating means comprising a groove located in an axial end surface of said vent plug and having a depth which is at least substantially equal to the predetermined distance.

8. A method of molding a tire which is made from an elastomeric material capable of flowing prior to curing, said method comprising the steps of:
   placing an uncured tire in a mold cavity for shaping the tire;
   forcing an external surface of the uncured tire against a surface defining the mold cavity;
   venting fluid from between the external surface of the uncured tire and the surface defining the mold cavity during said forcing step through a tubular metal vent plug located in a passage in the mold and which vent plug extends into the cavity a predetermined distance to form a circular recess in the tread of the tire surrounding a projection extending from the tire and which projection is formed by uncured elastomeric material flowing into an opening in the vent plug; and curing the tire.

9. The method set forth in claim 8 further including the step of stripping the cured tire from the mold and deflecting the projection into the recess to prevent shearing of the projection during stripping of the tire from the mold.

10. The method set forth in claim 8 wherein said venting step further includes the step of forming the recess to a depth of 0.03 inch to 0.05 inch taken in a direction substantially radially of the longitudinal central axis of the tire.

11. The method set forth in claim 8 further including the step of forming a groove in the tire with a rib extending into the cavity and in which the opening in the vent plug is located entirely within 0.2 inch of the rib.

* * * * *